(12) United States Patent
Her et al.

(10) Patent No.: US 8,399,137 B2
(45) Date of Patent: *Mar. 19, 2013

(54) ELECTROLYTE FOR ELECTROCHEMICAL DEVICE AND THE ELECTROCHEMICAL DEVICE THEREOF

(75) Inventors: Li-Jane Her, Kaohsiung County (TW); Chih-Wei Huang, Chiayi County (TW); Po-Cheng Chen, Hsinchu (TW)

(73) Assignee: Taiwan Hopax Chems. Mfg. Co., Ltd. (TW)

( * ) Notice: Subject to any disclaimer, the term of this patent is extended or adjusted under 35 U.S.C. 154(b) by 568 days.

This patent is subject to a terminal disclaimer.

(21) Appl. No.: 12/656,072

(22) Filed: Jan. 15, 2010

(65) Prior Publication Data

US 2010/0183927 A1 Jul. 22, 2010

(30) Foreign Application Priority Data

Jan. 20, 2009 (TW) ................ 98102003 A

(51) Int. Cl.
*H01M 6/18* (2006.01)
(52) U.S. Cl. ........ 429/307; 429/306; 429/336; 429/338; 429/341; 429/342; 429/339; 429/199; 429/200; 252/62.2
(58) Field of Classification Search .............. 429/307, 429/306, 336, 338, 341, 342, 339, 199, 200; 252/62.2
See application file for complete search history.

(56) References Cited

PUBLICATIONS

Webster, "Cyclic carbonate functional polymers and their applications", Progress in Organic Coatings, (2003), 47 (1), pp. 77-86.*

* cited by examiner

*Primary Examiner* — Laura Weiner
(74) *Attorney, Agent, or Firm* — Bacon & Thomas, LLP

(57) ABSTRACT

The present invention provides an electrolyte containing novel additive for electrochemical device and the electrochemical device thereof. The additive is a compound represented by below formula (I):

(I)

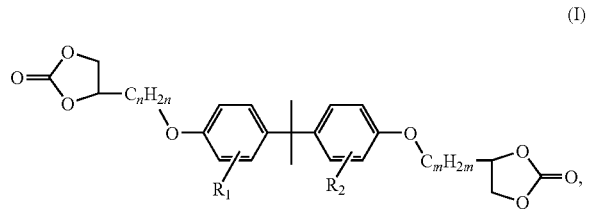

wherein $R_1$ and $R_2$ are independently hydrogen, methyl, ethyl, or halogen; n and m are independently 1, 2, or 3. The additive of the present invention can protect the surface of the carbonaceous material on the anode and suppress the occurrence of exfoliation, thereby increasing the lifetime of the electrochemical device. Furthermore, the additive of the present invention also slows down the decay of capacity on the cathode during charging-discharging cycles, and hence maintains a better performance.

8 Claims, 5 Drawing Sheets

Comparative example 1        Example 1

ELECTROLYTE FOR ELECTROCHEMICAL DEVICE AND THE ELECTROCHEMICAL DEVICE THEREOF

BACKGROUND OF THE INVENTION

1. Field of the Invention

The present invention relates to a nonaqueous electrolyte for an electrochemical device, and more particularly to an electrolyte additive which is useful to suppress the occurrence of degradation, and an electrochemical device having the same.

2. Description of the Related Art

In recent years, there is an increase tendency to research the energy saving technology. Rechargeable batteries have been popularly applied in several aspects, such as mobile phones, camcorders, and notebooks. The related field has been extensively researched, wherein secondary batteries are more interested. For secondary batteries, the major research is in enhancing the energy density and the cycle life.

In current secondary batteries, lithium ion batteries are developed in 1990. In comparison with traditional batteries using aqueous electrolytes (such as nickel-hydride batteries, nickel-cadmium batteries, and lead acid batteries), lithium ion batteries have high working voltage and energy density. Therefore, people invest a lot of time in researches of lithium ion batteries. However, one of the drawbacks of lithium ion batteries is the capacity fading during repeated charging-discharging cycles. The more the capacity of a lithium ion battery has, the more serious this problem is. Hence, lifetimes of lithium ion batteries need to be further enhanced. One of approaches to enhance the lifetimes of lithium batteries is to modify electrolyte composition by suitable additives.

In the electrolytes of lithium ion batteries, carbonate-based organic compounds are commonly used as solvents. According to their structures and characteristics, they are briefly classified into two groups: one is cyclic carbonates with high dielectric constant and viscosity, such as ethylene carbonate (EC) and propylene carbonate (PC); the other group is linear carbonates with low dielectric constant and viscosity, such as dimethyl carbonate (DMC), diethyl carbonate (DEC), and ethyl methyl carbonate (EMC). An ideal electrolyte must have high dielectric constant and low viscosity at the same time. Thus, general electrolytes contain a mixture of cyclic carbonates and linear carbonates to obtain the required properties of both dielectric constant and viscosity.

However, EC and PC have the following characteristics, respectively. During the first charging step, EC can form a stable passivation layer, such as a solid electrolyte interface (SEI), on the surface of anode to protect the anode material from exfoliation, while PC can not do the same. However, EC will loss its fluidity under 37° C. (melting point of EC). It will result in poor charging-discharging performances of battery under low temperature. Conversely, PC still has a good fluidity under low temperature arising from its low melting point (−49° C.), but it is prone to produce co-intercalation with lithium ions into graphite layers during a charge process, resulting in detrimental graphite exfoliation. Thus, if the content of PC is too high, it usually results in decreasing the lifetime of a battery.

In order to solve the above problems, a mixture of EC and PC is usually used in commercially available electrolytes to avoid the above drawbacks and enhance the performance of a battery. Except for adjusting the ratio of solvents, using additives is the most effective way to improve lifetime, capacity, low temperature performance and of a battery. Nevertheless, common additives such as vinylene carbonates, sulfites, sulfates, phosphates or derivatives thereof have not only expensive prices, but also barely satisfactory effects.

In this regard, Japanese publication patent 2002-158034 disclosed an acrylic acid compound used as an additive of electrolyte in a lithium ion secondary battery. The additive (acrylic acid) can suppress gas reduction and the decay of anode in the lithium ion secondary battery. Besides, Japanese publication patent 2003-168479 disclosed an acrylic acid compound with at least three acrylic aldehyde groups used as an additive of electrolyte in a lithium ion secondary battery. The compound can form a solid electrolyte interface (SEI) layer by the reduction reaction on the anode. The SEI layer can suppress the degradation of an electrolyte, and to improve cycle life of the battery. In addition, WO 2008/050971 disclosed an acrylic acid compound with a polymerizable double bond used as an additive of electrolyte in a lithium ion battery. The acrylic acid compound also had the effect of forming a SEI layer.

Based on the existing techniques, we desire to develop a novel additive of lithium ion battery which is useful for forming a steady SEI layer on the surface of the carbonaceous material to suppress its exfoliation, thereby further enhancing the lifetime of a lithium ion secondary battery.

SUMMARY OF THE INVENTION

In view of the disadvantages of conventional technology, one object of the present invention is to provide a nonaqueous electrolyte for an electrochemical device such as a lithium ion secondary battery. A steady SEI layer can be formed on the surface of the carbonaceous material of the anode by using the new additive to suppress the occurrence of exfoliation, thereby enhancing the lifetime of a battery. Moreover, the electrolyte is beneficial to slow down the decay of capacity on the cathode during charging-discharging cycles. Hence, it can maintain a better performance for long.

Another object of the present invention is to provide an electrochemical device using said electrolyte. Because the electrolyte has the novel additive, it can form a steady SEI layer on the surface of the carbonaceous material of the anode to suppress the occurrence of exfoliation, thereby enhancing the lifetime of a battery. Moreover, the electrolyte is beneficial to slow down the decay of capacity on the cathode during charging-discharging cycles. Therefore, it can maintain a better performance for long.

To achieve the above objects, the present invention provides an electrolyte for an electrochemical device, comprising an organic solvent, a salt, and a compound represented by formula (I):

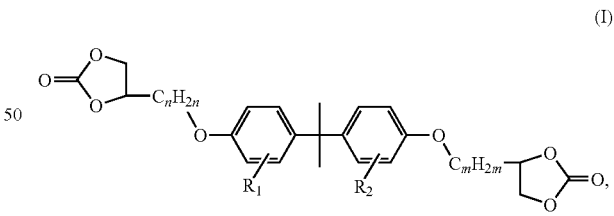

wherein $R_1$ and $R_2$ are independently hydrogen, methyl, ethyl, or halogen; n and m are independently an integer of 1, 2, or 3.

When said compound represented by formula (I) is used as an additive of electrolyte, it can form a special SEI layer on the surface of the carbonaceous material of the anode in the electrochemical device. Said special SEI layer not only can protect the structure of the carbonaceous material, but also can suppress the occurrence of exfoliation during charging-discharging cycles. Hence, it is able to enhance the lifetime of battery. Moreover, compared to the conventional additives, propane sultone (PS) and vinylene carbonate (VC), the additive of the present invention can increase the tolerance of the carbonaceous material in PC electrolyte and can fulfill the effect of protecting the carbonaceous material by less amount of additive. Besides, the additive is useful to slow down the decay of capacity on the cathode during charging-discharging cycles, and hence maintains a better performance for long.

Preferably, the electrolyte of the present invention comprises the compound represented by formula (I-a):

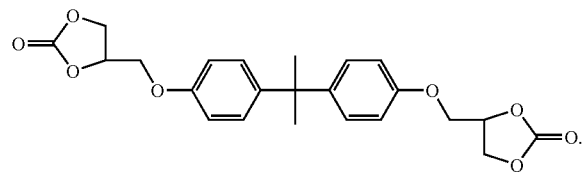

(I-a)

Preferably, the amount of the compound represented by formula (I) is 0.1-10 wt %. More preferably, the amount of the compound represented by formula (I) is 0.5-5 wt %.

Preferably, said organic solvent is selected from the group consisting of cyclic carbonates, linear carbonates, lactones, ethers, esters, acetonitriles, lactams, ketones, and halogen derivatives thereof.

Preferably, a cation of said salt is selected from the group consisting of $Li^+$, $Na^+$, and $K^+$, and an anion of said salt is selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$.

The present invention also provides an electrochemical device, comprising an anode, a cathode, and the electrolyte of the present invention.

Preferably, said electrochemical device is a lithium ion secondary battery.

Yet the present invention provides a use of a compound represented by formula (I) for using as an additive of electrolyte.

From above, a new additive is used in the electrolyte of present invention for an electrochemical. The new additive can form a special SEI layer on the surface of the carbonaceous material of the anode to suppress the occurrence of exfoliation, thereby enhancing the lifetime of battery. Besides, the new additive can slow down the decay of capacity on the cathode. Compared to the conventional additives of electrolyte (such as propane sultone (PS) and vinylene carbonate (VC)), the new additive has the more excellent effect on suppressing the occurrence of exfoliation.

DETAILED DESCRIPTION OF THE PREFERRED EMBODIMENTS

Figure 1A:
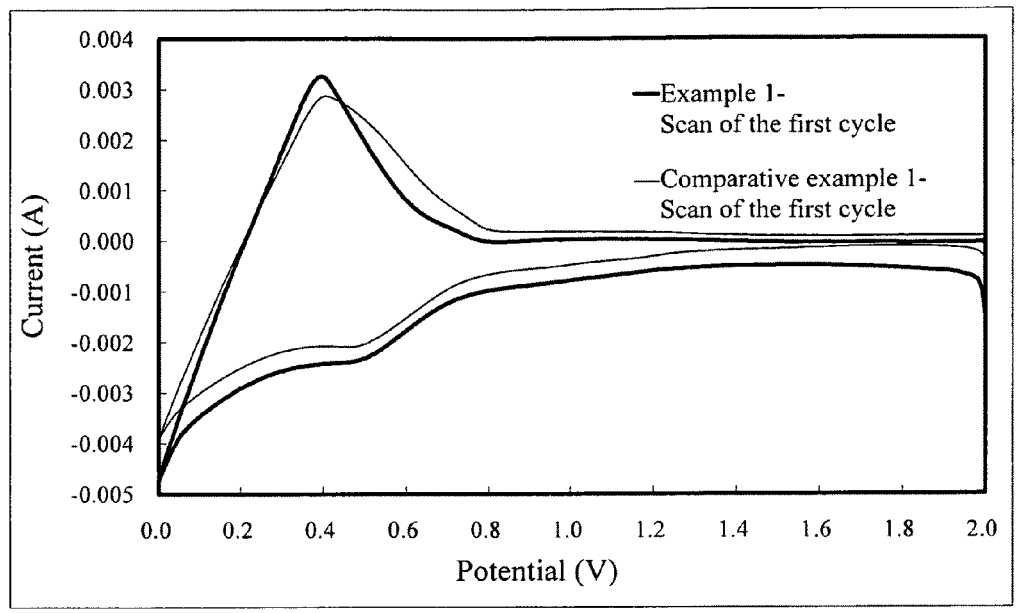
FIG. 1A shows the result of the first cycle of the cyclic voltammetry test according to the battery of the example 1 and comparative example 1 of the present invention.

As above-mentioned, a new additive is used in the electrolyte of present invention for an electrochemical device. The new additive can form a special SEI layer on the surface of the carbonaceous material of the anode. This special SEI layer not only can protect the structure of the carbonaceous material, but also can suppress the occurrence of exfoliation during charging-discharging cycles, resulting in increase of the battery lifetime. Moreover, the new additive not only can enhance the tolerance of the carbonaceous material in PC electrolyte, but also can fulfill the effect of protecting the carbonaceous material by less amount of additive when compare with the traditional additive (PS and VC). Besides, the additive is also useful to slow down the decay of capacity on the cathode during charging-discharging cycles, and hence maintains a better performance for long.

The organic solvent used in the present invention can be conventional organic solvents. For example, the organic solvent includes, but is not limited to, cyclic carbonates, linear carbonates, lactones, ethers, esters, acetonitriles, lactams, ketones, or halogen derivatives of the above.

The salt used in the present invention is also conventional salts. A cation of the salts comprises, but is not limited to, $Li^+$, $Na^+$, or $L^+$, and an anion of the salts comprises, but is not limited to, $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$.

The electrolyte of the present invention is suitable for general electrochemical devices, especially lithium ion secondary batteries.

The examples of this invention are provided hereinafter; however, these examples are not used for limit the present invention. Any amendments and modifications can be made by those skilled in the art without departing the spirit and scope of the present invention. The scope of the present invention is defined by the appended claims.

Example 1

Cyclic Voltammetry Test of the Lithium Ion Secondary Battery with the Additive of the Present Invention The test according to the example 1 of the present invention was conducted in the lithium ion secondary battery. Table 1 listed the materials and components used in the lithium ion secondary batteries of the example 1. The comparative example 1 used the same materials as the example 1 except no additive. The electrode materials used in the present invention and the methods for producing the same were known in the art and the technical features of the present invention can be easily understood and performed by those skilled in the art according to the disclosure herein, so the processes were not mentioned in detail here. Besides, the concentration of the additive used in Table 1 was 1 wt %; however, the concentration of the additive can be in the range of 0.1 wt % to 10 wt %, which was easily understood by those skilled in the art. Therefore, the concentration recited in Table 1 was used for illustration, not used for limit the present invention.

the additive of the present invention was benefic to promote the formation of steady SEI layer on the anode.

Figure 2:
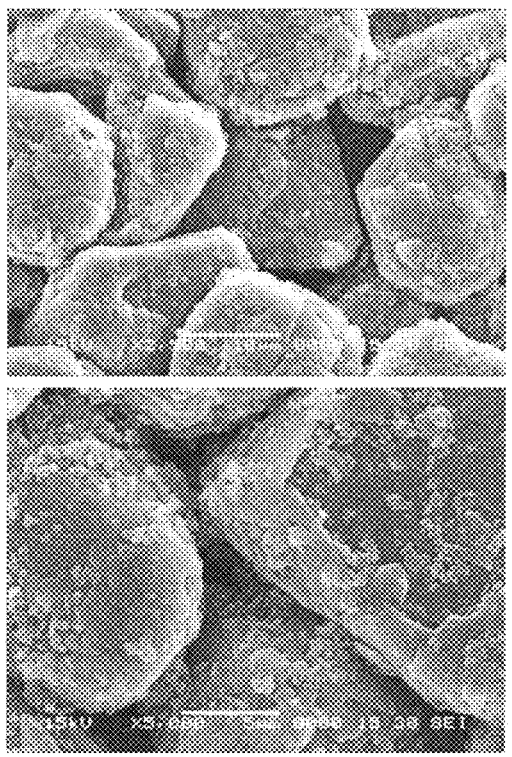
FIG. 2 shows the surfaces of the carbonaceous material of the comparative example 1 and the example 1 after cyclic voltammetry test.
Figure 2:
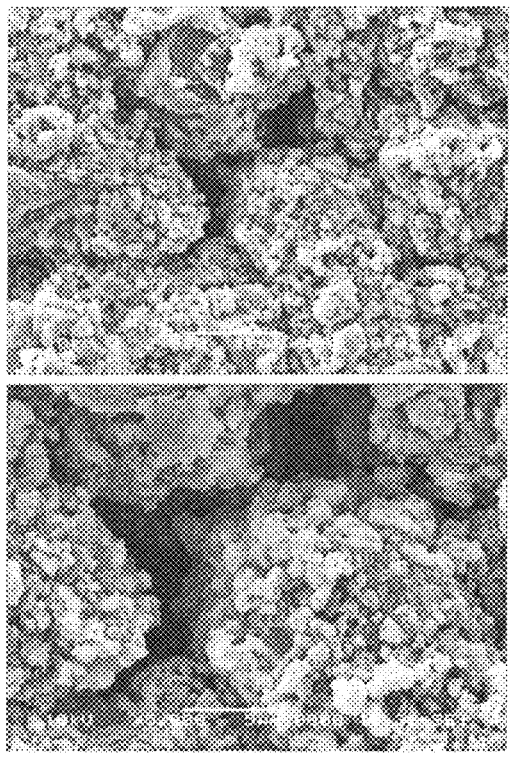

After cyclic voltammetry test, the surface of anode sheet was observed using surface electron microscopy. The result was shown in FIG. 2. As shown in FIG. 2, a thick SEI layer

TABLE 1 the materials and components used in the lithium ion secondary batteries of the example 1

| Anode sheet | | NG/conductive carbon black/PVdF = 90/3/7 (wt %) |
|---|---|---|
| Electrolyte 1 | Organic solvent | EC:DEC = 1:1 (by weight) |
| | Salt | 1M LiPF$_6$ |
| | Additive | (I-a) (1 wt %) |

*NG: natural crystalline flake graphite
PVdF: polyvinylidene difluoride
DEC: diethyl carbonate
EC: ethylene carbonate Cyclic Voltammetry Test The batteries of the example 1 and the comparative example 1 were conducted cyclic voltammetry (CV) tests. As above-mentioned, the materials of the electrode sheet used in the CV test and the method for producing the same were known in the art, which were not used for limit the present invention. A preparation of an electrode sheet used in the CV test included, but was not limited to, cutting a rolled anode sheet into a size of 2×4 cm$^2$, wherein the slurry-coated part (i.e. the part of anode sheet used in Table 1) was 2×2 cm$^2$, and the part of copper foil was 2×4 cm$^2$; welding a Ni handle to the center of the part of the copper foil on the cut electrode sheet by ultrasonic welding machine; and sticking insulating tape to the face of the welded anode sheet and the edge thereof to leave an circular area having diameter of 13 mm for test.

Figure 1B:
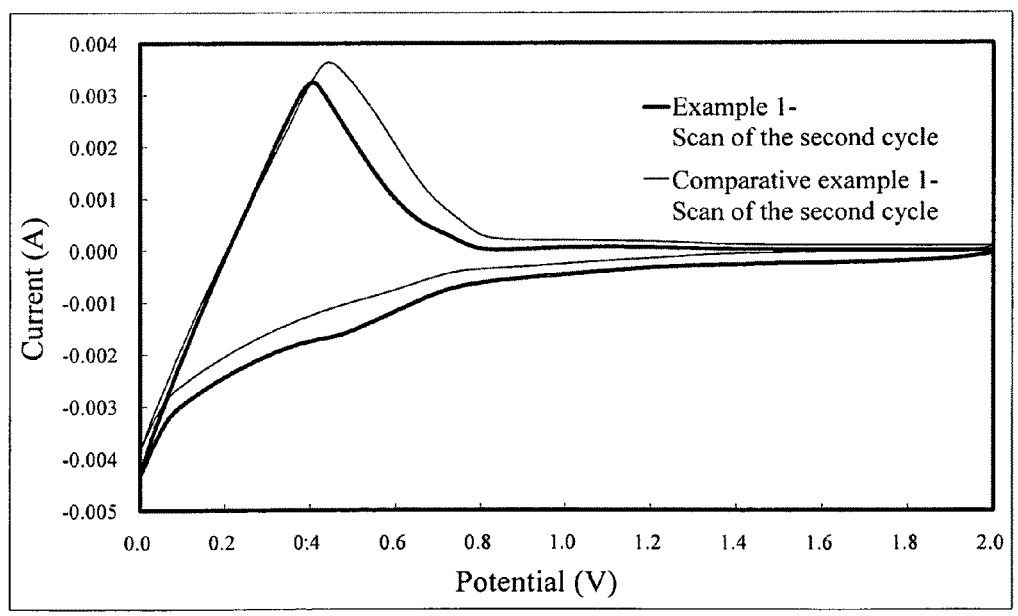
FIG. 1B shows the result of the second cycle of the cyclic voltammetry test according to the battery of the example 1 and the comparative example 1 of the present invention.

CV test was conducted in an electrolytic bath with an electrolyte containing EC/DEC (weight ratio of 1/1) and 1M LiPF$_6$. Moreover, the cut and stuck anode sheet was connected to a working electrode, and lithium metal was used as a counter electrode and reference electrode. The test was carried out in a glove box under argon atmosphere at room temperature, wherein the concentration of H$_2$O and O$_2$ was less than 10 ppm. The condition for test was scanning speed of 1.0 mV/s and scanning voltage of 0~2 V. The result of test was shown in FIG. 1B. During scan of the second cycle, an apparent peak was observed within 0.4~0.6 V when the additive of the present invention was added, indicating that the SEI layer on the anode was continuously formed. From above results, was formed on the surface of the carbonaceous material in the example 1. Compared to the SEI layer of the example 1, that of the comparative example 1 was thin and had loose structure. This proved that the additive used in the example was useful for forming a steady SEI layer.

Example 2

Charging-Discharging Test of the Lithium Ion Secondary Battery with the Additive of the Present Invention The test according to the example 2 of the present invention was conducted in the lithium ion secondary battery. Table 2 listed the materials and components used in the lithium ion secondary batteries of the example 2. The comparative example 2 used the same materials as the example 2 except for no additive, the comparative example 3 used the same materials as the example 2 except for use of 1.0 wt % PS as an additive, and the comparative example 4 used the same materials as the example 2 except for use of 1.0 wt % VC as an additive.

TABLE 2 the materials and components used in the lithium ion secondary batteries of the example 2

| Anode sheet | | NG/conductive carbon black/PVdF = 90/3/7 (wt %) |
|---|---|---|
| Electrolyte 2 | Organic solvent | PC:DEC = 1:2 (by weight) |
| | Salt | 1M LiPF$_6$ |

TABLE 2-continued the materials and components used in the lithium ion secondary batteries of the example 2

| Additive | |
|---|---|
| 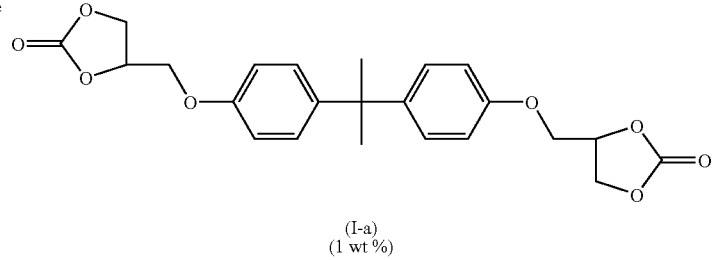 | |
| (I-a) (1 wt %) | |

Charging-Discharging Test

In order to test charging-discharging performance of batteries, the batteries of the example 2 and the comparative examples 2, 3 and 4 were fabricated into coin half-cell, and then connected with a charging-discharging tester (8 channels). During the charging-discharging test, the batteries were charged at 0.1 C to a cut-off voltage of 0.003 V, and then discharged at 0.1 C to a cut-off voltage of 1.8 V, which was defined as a charging-discharging cycle. In this test, there was totally five charging-discharging cycles. Besides, changes of voltage were recorded by a computer during the test and the resulting data were calculated to obtain the values of capacity.

Figure 3A:
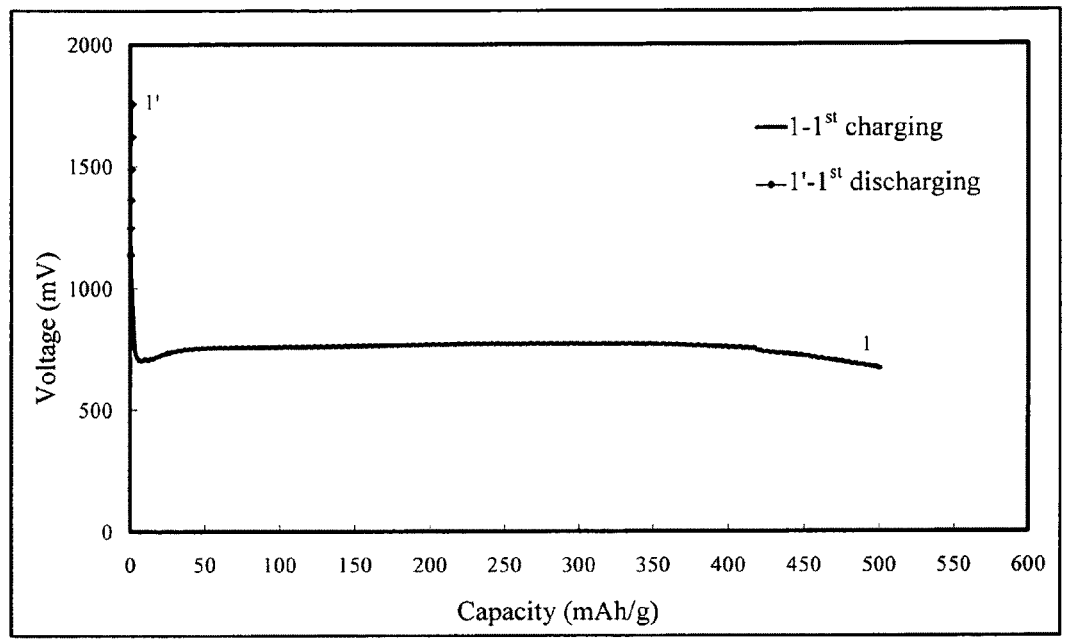
FIG. 3A shows the result of charging-discharging test according to the battery of comparative example 2 of the present invention.
Figure 3B:
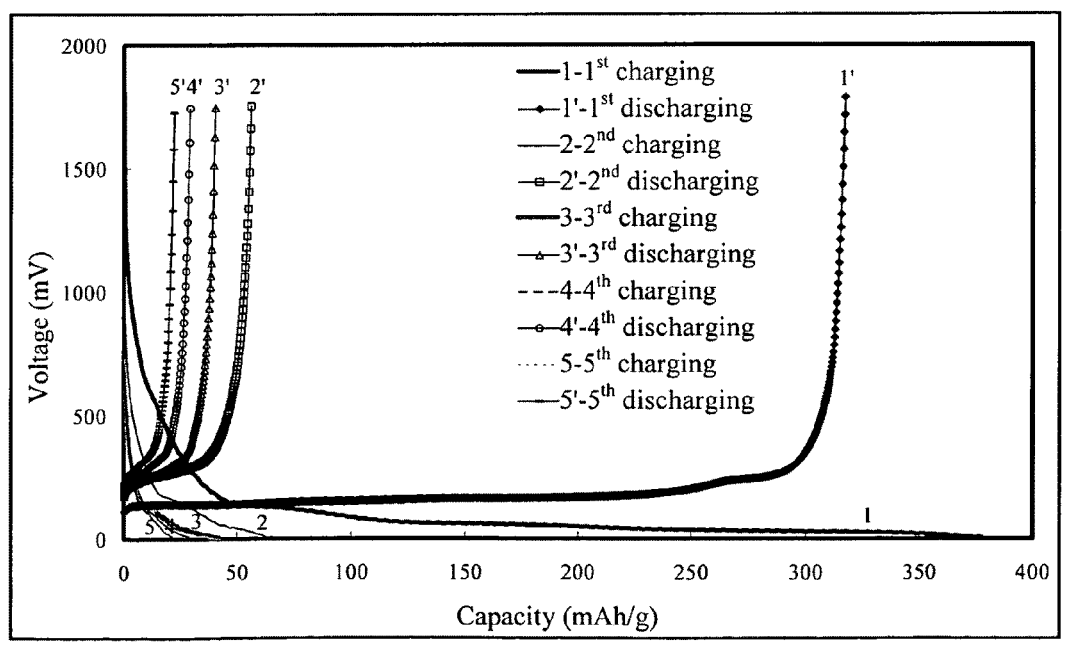
FIG. 3B shows the result of charging-discharging test according to the battery of comparative example 3 of the present invention.
Figure 3C:
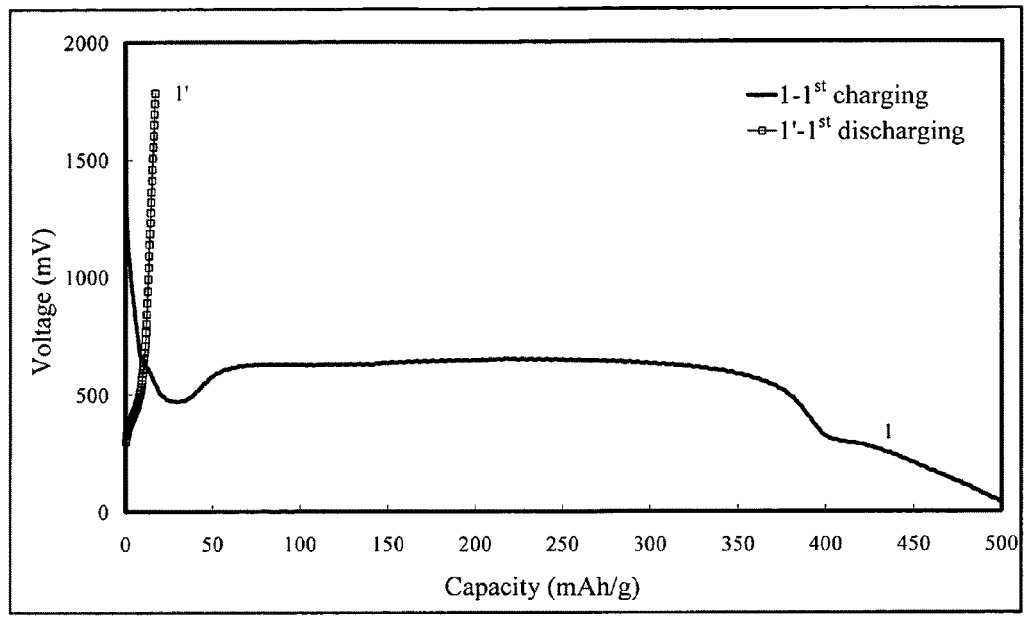
FIG. 3C shows the result of charging-discharging test according to the battery of comparative example 4 of the present invention.
Figure 3D:
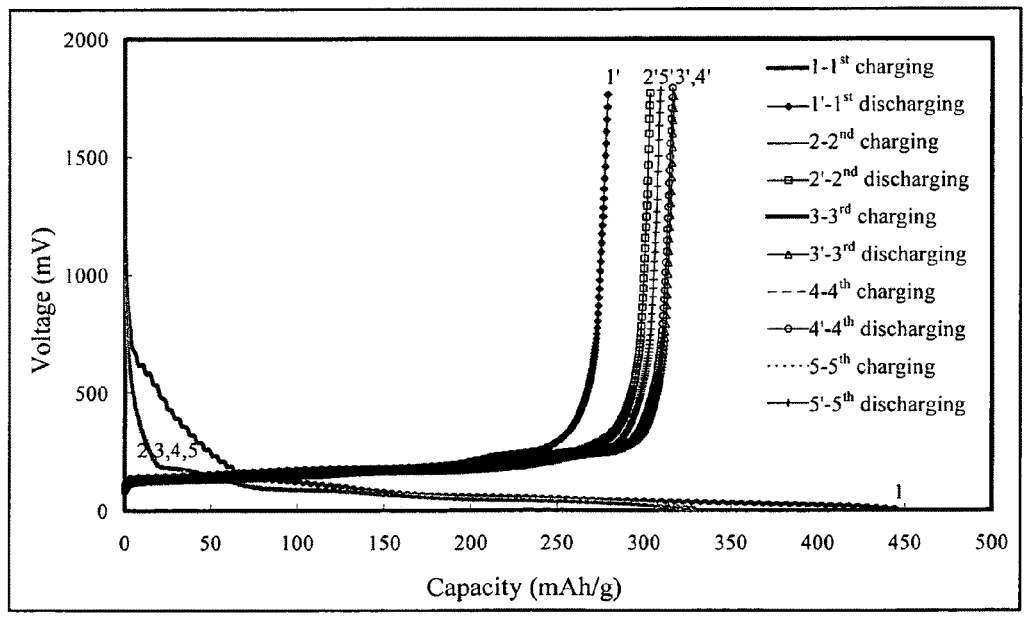
FIG. 3D shows the result of charging-discharging test according to the battery of example 2 of the present invention.

FIG. 3A to FIG. 3D showed the results of charging-discharging tests according to the batteries of the comparative examples 2, 3, and 4, and the example 2, respectively. In these figures, FIG. 3A showed that the battery of the comparative example 2 containing no additive can not normally discharge during the first discharging cycle, indicating that the carbonaceous materials collapsed during the first cycle charging-discharging test. FIG. 3B showed that the battery of the comparative example containing 1 wt % PS can normally discharge during the first cycle charging-discharging test; however, the charging and discharging capacity decayed quickly after the second cycle charging-discharging test. The result demonstrated that the carbonaceous material collapsed after the second cycle charging-discharging test. Besides, FIG. 3B also showed that the fifth reversible discharging capacity was only 21 mAh/g, lower than 7% of the first discharging capacity. According to FIG. 3C, it showed that the battery of the comparative example 4 containing 1 wt % VC collapsed during the first cycle charging-discharging test and the first reversible discharging capacity was lower than 20 mAh/g. FIG. 3D showed that the battery of the example 2 containing 1 wt % compound of formula (I-a) had a discharging capacity of more than 300 mAh/g, indicating that the battery still maintained an excellent reversible charging-discharging property after continuous five charging-discharging test. From the above results, the electrolyte of the present invention was useful for suppressing the exfoliation of materials used in the batteries, and therefore enhanced the lifetime of batteries.

Example 3

Cycle Life Test of the Lithium Ion Secondary Battery with the Additive of the Present Invention The test according to the example 3 of the present invention was conducted in the lithium ion secondary battery. Table 3 listed the materials and components used in the lithium ion secondary batteries of the example 3. The comparative example 5 used the same materials as the example 3 except no additive.

TABLE 3 the materials and components used in the batteries of the example 3

| Anode sheet | | NG-Sn/conductive carbon black/PVdF = 90/3/7 (wt %) |
|---|---|---|
| Electrolyte 3 | Organic solvent | PC:EC:DEC = 8:22:70 (wt %) |
| | Salt | 1M LiPF$_6$ |
| | Additive | 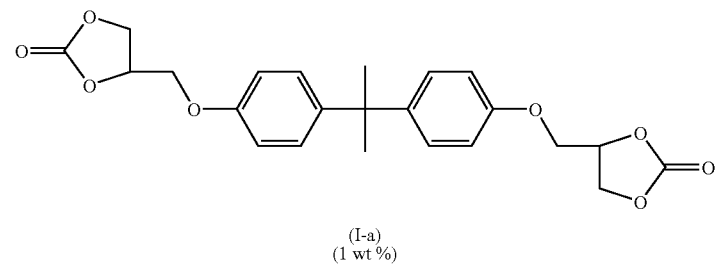 [SMILES: CC(C)(c1ccc(OCC2COC(=O)O2)cc1)c1ccc(OCC2COC(=O)O2)cc1] |
| | | (I-a) (1 wt %) |

*NG-Sn referred to natural crystalline flake graphite modified by tin without electroplating Cycle Life Test In order to test cycle life of the batteries, the batteries of the example 3 and the comparative example 5 were fabricated into coin half-cells, and then connected with a charging-discharging tester (8 channels). During the charging-discharging test, the batteries were charged at 0.1 C to a cut-off voltage of 0.003 V, and then discharged at 0.5 C to a cut-off voltage of 1.8 V. In this test, there was totally thirty charging-discharging cycles. Besides, changes of voltage were recorded by a computer during the test and the resulting data were calculated to obtain values of capacity.

Figure 4:
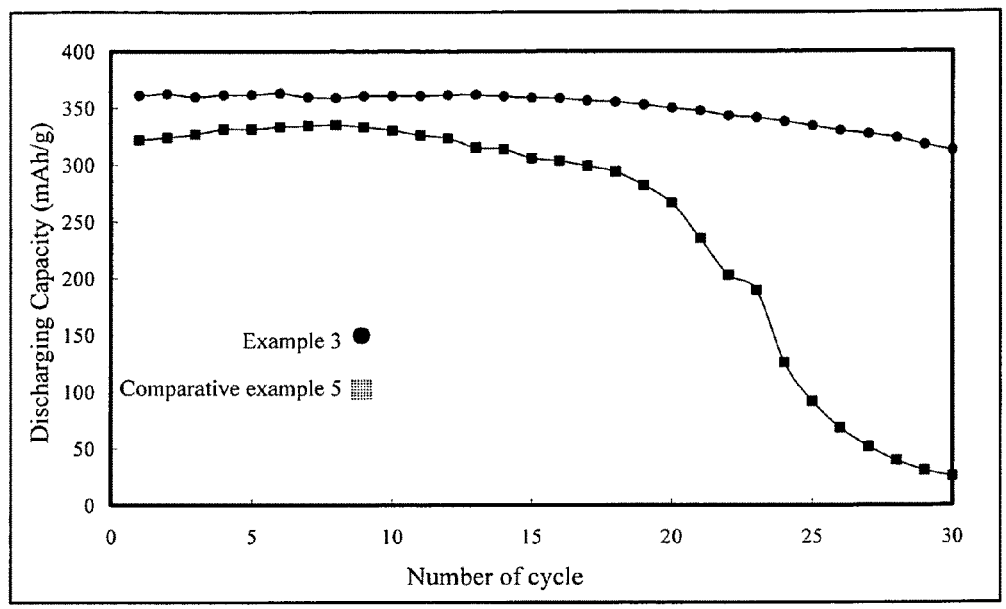
FIG. 4 shows the results of cycle lifetime test according to the batteries of example 3 and comparative example 5 of the present invention.

FIG. 4 showed the results of cycle lifetime test according to the batteries of example 3 and comparative example 5 of the present invention. According to the result of cycle life test, the capacity of the battery of the example 3 was higher than that of the comparative example 5 containing no additive. Moreover, the battery of the example 3 still had a capacity more than 300 mAh/g after the cycle life test of thirty times, while the battery of the comparative example 5 had a decayed capacity less than 50 mAh/g. This result showed that the additive of the present invention can enhance the capacity of the battery and effectively enhance the cycle life of battery.

Example 4

Effect of the Electrolytes of the Present Invention on Cathode Sheet

The examples 1-3 as above-mentioned were all test results showing effect of the electrolytes of the present invention on anode sheet. In order to test effect of the electrolytes of the present invention on cathode sheet, LiFePO$_4$/conductive carbon black/PVdF and lithium metal were used as a cathode and an anode, respectively. In the table 4, it listed the materials and components used in the lithium ion secondary batteries of the example 4 in detail. Equally, the materials of the cathode sheet used in the present invention and the methods for producing the same were known in the art, so they were not mentioned herein.

TABLE 4

| the materials and components used in the batteries of the example 4 | |
|---|---|
| Cathode sheet | LiFePO$_4$/conductive carbon black/PVdF = 91/3/6 (wt %) |
| Anode sheet | Lithium metal |
| Electrolyte Organic solvent | EC:DEC = 1:1 (by weight) |
| Salt | 1M LiPF$_6$ |
| Additive | (I-a) (1 wt %) |

Figure 5:
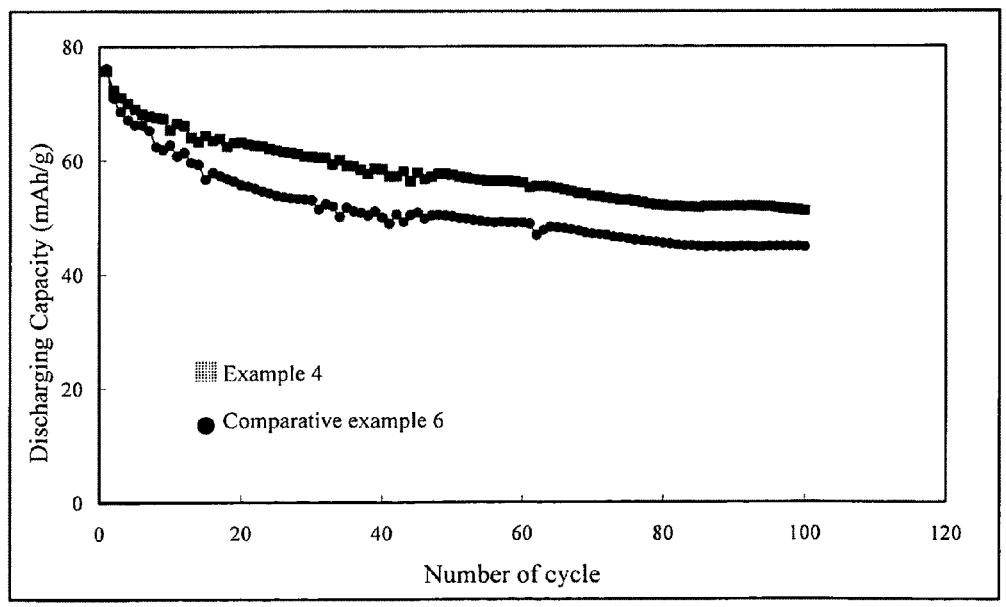
FIG. 5 shows the results of cycle lifetime test according to the batteries of example 4 and comparative example 6 of the present invention.

The capacity of the battery of the example 4 was measured by charging-discharging cycle test under room temperature. In said test, the charging condition was constant-current charge of 1 C and cut-off charge of 4.0 V, and the discharging condition was constant-current discharge of 1 C and cut-off discharge of 2.5 V. FIG. 5 showed that the changes of capacity depended on the numbers of charging-discharging cycle, wherein the comparative example 6 used the same materials as the example 4 except for no additive. From the results shown in FIG. 5, the electrochemical device using the electrolyte of the present invention can maintain a higher capacity.

To sum up above, the electrolyte of the present invention can form a steady SEI layer on the carbonaceous material of anode by using new additives to protect the surface of carbonaceous material and suppress the occurrence of exfoliation, thereby enhancing the lifetime of the battery. Furthermore, the additive of the present invention was useful for slowing down the decay of capacity on the cathode and hence maintained a better performance.

Other Embodiments

All characteristics disclosed herein can be combined in any combination. And the characteristics disclosed herein can be replaced by any characteristics to be used for the same, equal, or similar purpose. Thus, unless otherwise specified, the characteristics disclosed herein are examples of a series of equal or similar characteristics.

In addition, based on the disclosure herein, appropriate changes and modifications may be made by those skilled in the art according to different uses and situations without departing from the spirit and scope of the invention. Therefore, other embodiments are included in the claims of the present invention.

What is claimed is:

1. An electrolyte for an electrochemical device, comprising:
    an organic solvent,
    a salt, and
    a compound represented by formula (I):

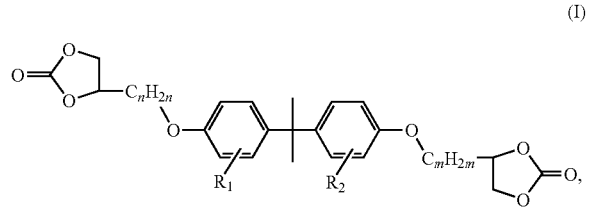

wherein $R_1$ and $R_2$ are independently hydrogen, methyl, ethyl, or halogen; n and m are independently an integer of 1, 2, or 3; wherein the amount of the compound represented by formula (I) is 0.1-10 wt %.

2. The electrolyte according to claim 1, wherein the compound represented by formula (I) is the compound represented by formula (I-a):

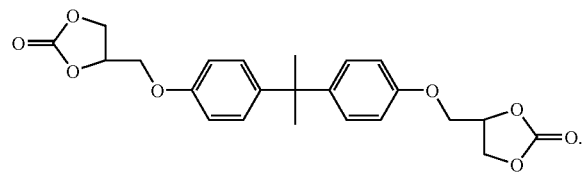

(I-a)

3. The electrolyte according to claim 1, wherein the amount of the compound represented by formula (I) is 0.5-5 wt %.

4. The electrolyte according to claim 1, wherein said organic solvent is selected from the group consisting of carbonates, lactones, ethers, esters, acetonitriles, lactams, ketones, and halogen derivatives thereof.

5. The electrolyte according to claim 1, wherein a cation of said salt is selected from the group consisting of $Li^+$, $Na^+$, and $K^+$.

6. The electrolyte according to claim 5, wherein an anion of said salt is selected from the group consisting of $PF_6^-$、 $BF_4^-$、$Cl^-$、$Br^-$、$I^-$、$ClO_4^-$、$AsF_6^-$、$CH_3CO_2^-$、$CF_3SO_3^-$、$N(CF_3SO_2)_2^-$, and $C(CF_2SO_2)_3^-$.

7. An electrochemical device, comprising an anode, a cathode, and the electrolyte according to claim 1.

8. The electrochemical device according to claim 7, which is a lithium ion secondary battery.

* * * * *